US009432826B2

(12) United States Patent
Ickman et al.

(10) Patent No.: US 9,432,826 B2
(45) Date of Patent: Aug. 30, 2016

(54) EVENT PLANNING WITHIN SOCIAL NETWORKS

(71) Applicant: MICROSOFT TECHNOLOGY LICENSING, LLC, Redmond, WA (US)

(72) Inventors: Steve Ickman, Snoqualmie, WA (US); Lili Cheng, Bellevue, WA (US); Matthew Bret MacLaurin, Woodinville, WA (US); Christian James Colando, Seattle, WA (US); Eric Steven Anderson, Seattle, WA (US); David Arthur Raskino, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/006,553

(22) Filed: Jan. 26, 2016

(65) Prior Publication Data

US 2016/0140512 A1 May 19, 2016

Related U.S. Application Data

(63) Continuation of application No. 12/956,162, filed on Nov. 30, 2010, now Pat. No. 9,253,615.

(51) Int. Cl.
| | |
|---|---|
| *G06F 15/16* | (2006.01) |
| *H04W 4/20* | (2009.01) |
| *G06Q 10/10* | (2012.01) |
| *H04L 29/08* | (2006.01) |
| *G06Q 50/00* | (2012.01) |

(52) U.S. Cl.
CPC ......... *H04W 4/206* (2013.01); *G06Q 10/1095* (2013.01); *G06Q 50/01* (2013.01); *H04L 67/18* (2013.01)

(58) Field of Classification Search
None
See application file for complete search history.

(56) References Cited

U.S. PATENT DOCUMENTS 7,523,385 B2 * 4/2009 Nguyen ................ G06Q 10/02
705/5
7,530,021 B2 5/2009 Cheng et al.
(Continued)

FOREIGN PATENT DOCUMENTS

CN 1619564 A 5/2005
KR 1020010007968 A 2/2001

OTHER PUBLICATIONS

"Final Office Action Issued in U.S. Appl. No. 12/956,162", Mailed Date: Mar. 13, 2013, 19 Pages. (MS# 331106.01).
(Continued)

*Primary Examiner* — Gurkanwaljit Singh
(74) *Attorney, Agent, or Firm* — Steve Wight; Doug Barker; Micky Minhas

(57) ABSTRACT

Generating and updating event presentation user interfaces. Embodiments include identifying a first geographical location of a first computing device corresponding to a first invitee to an event, and a second geographical location of a second computing device corresponding to a second invitee. An event presentation user interface is generated, to include a first invitee presence indicator indicating that the first invitee is within a predetermined distance from a geographical location of the event, and a second invitee presence indicator indicating the second invitee is outside of the predetermined distance from the geographical location of the event. Based at least on the second computing device having moved to a third geographical location that is within the predetermined distance from the geographical location of the event, the second invitee presence indicator is updated to indicate that the second invitee is within the predetermined distance from the geographical location of the event.

20 Claims, 11 Drawing Sheets

(56) References Cited

U.S. PATENT DOCUMENTS

| | | | | |
|---|---|---|---|---|
| 2002/0128934 | A1* | 9/2002 | Shaer | G06Q 10/087 |
| | | | | 705/14.4 |
| 2002/0156787 | A1 | 10/2002 | Jameson et al. | |
| 2004/0010512 | A1* | 1/2004 | Smith | G06Q 10/10 |
| 2005/0075925 | A1 | 4/2005 | Sash | |
| 2005/0102245 | A1 | 5/2005 | Edlund et al. | |
| 2005/0209914 | A1* | 9/2005 | Nguyen | G06Q 10/02 |
| | | | | 705/14.56 |
| 2006/0252547 | A1* | 11/2006 | Mizrahi | A63F 13/10 |
| | | | | 463/42 |
| 2007/0038503 | A1* | 2/2007 | Krajcev | G06Q 10/02 |
| | | | | 705/301 |
| 2007/0039024 | A1* | 2/2007 | Krajcev | G06Q 10/02 |
| | | | | 725/46 |
| 2007/0118415 | A1 | 5/2007 | Chen et al. | |
| 2007/0156883 | A1* | 7/2007 | Thompson | G06Q 10/10 |
| | | | | 709/223 |
| 2007/0198500 | A1 | 8/2007 | Lucovsky et al. | |
| 2007/0233736 | A1* | 10/2007 | Xiong | G06Q 30/02 |
| 2008/0092059 | A1* | 4/2008 | White | G06Q 10/06 |
| | | | | 715/747 |
| 2008/0098087 | A1* | 4/2008 | Lubeck | G06Q 10/00 |
| | | | | 709/218 |
| 2008/0120396 | A1* | 5/2008 | Jayaram | G06Q 10/10 |
| | | | | 709/218 |
| 2008/0140779 | A1 | 6/2008 | Ahn et al. | |
| 2008/0147743 | A1 | 6/2008 | Taylor et al. | |
| 2008/0270151 | A1* | 10/2008 | Mahoney | G06Q 30/02 |
| | | | | 705/1.1 |
| 2009/0222352 | A1* | 9/2009 | Shaer | G06Q 10/087 |
| | | | | 705/26.1 |
| 2010/0017714 | A1 | 1/2010 | Agarwal et al. | |
| 2011/0082008 | A1* | 4/2011 | Cheung | A63B 24/0062 |
| | | | | 482/8 |

OTHER PUBLICATIONS

"Final Office Action Issued in U.S. Appl. No. 12/956,162", Mailed Date: May 21, 2015, 9 Pages. (MS# 331106.01).

"Non Final Office Action Issued in U.S. Appl. No. 12/956,162", Mailed Date: Jun. 18, 2012, 20 Pages. (MS# 331106.01).

"Non Final Office Action Issued in U.S. Appl. No. 12/956,162", Mailed Date: Mar. 13, 2014, 30 Pages. (MS# 331106.01).

"Non Final Office Action Issued in U.S. Appl. No. 12/956,162", Mailed Date: Nov. 6, 2014, 34 Pages. (MS# 331106.01).

"Notice of Allowance Issued in U.S. Appl. No. 12/956,162", Mailed Date: Sep. 25, 2015, 5 Pages. (MS# 331106.01).

"First Office Action and Search Report Issued in Chinese Patent Application No. 201110408058.6", Mailed Date: May 5, 2015, 14 Pages. (MS# 331106.01).

"Second Office Action Issued in Chinese Patent Application No. 201110408058.6", Mailed Date: Jan. 6, 2016, 6 Pages. (MS# 331106.01).

Blanford, Roxanne, "Meeting Planners Embrace Social Media Tools", Retrieved from <<http://www.suite101.com/content/meeting-planners-embrace-social-media-tools-a234250>>, May 6, 2010, 22 Pages.

Cahill, Mark, "Plan Cast—An Application for Social Planning", Retrieved from <<http://socialbits.net/blog/plancast-an-application-for-social-planning>>, Aug. 1, 2010, 6 Pages.

Chau, et al., "Design and Evaluation of a Multi-Agent Collaborative Web Mining System", In Journal Decision Support Systems—Web Retrieval and Mining, vol. 35, Issue 1, 2002, pp. 167-183.

"International Preliminary Report on Patentability Issued in PCT Application No. PCT/US11/60710", Mailed Date: Jun. 4, 2013, 4 Pages. (MS# 331106.02).

"International Search Report and Written Opinion Issued in PCT Application No. PCT/US11/60710", Mailed Date: May 24, 2012, 8 Pages. (MS# 331106.02).

"Office Action Issued in European Patent Application No. 11844068.4", Mailed Date: May 23, 2016, 5 Pages.

"Supplementary Search Report Issued in European Patent Application No. 11844068.4", Mailed Date: May 9, 2016, 4 Pages.

"Google Maps—Wikipedia, the free encyclopedia", Retrieved From <<https://en.wikipedia.org/w/index.php?title=Google_Maps&oldid=398634378>>, Nov. 24, 2010, 17 Pages.

* cited by examiner

EVENT PLANNING WITHIN SOCIAL NETWORKS

RELATED APPLICATION

This application is a continuation of U.S. application Ser. No. 12/956,162, filed Nov. 30, 2010, entitled "EVENT PLANNING WITHIN SOCIAL NETWORKS," and which issued as U.S. Pat. No. 9,253,615 on Feb. 2, 2016. The entire content of the foregoing application is incorporated by reference herein in its entirety.

BACKGROUND

Within the field of computing, many scenarios involve a social network, such as a database of users and associations established thereamong to represent various types of relationships (e.g., familial relations, friendships, and academic, professional, and business relationships). For example, a user in a social network may establish a set of contacts, such as individuals with whom the user has a relationship, and may generate content items, such as personal status messages, private messages, photos, links to other resources such as websites, and commentaries) that may be accessible by such contacts, who may submit comments and relies to such content items.

Within a social network, a set of users may create an event. For example, a user may create a listing for an event, such as a party, occurring at a specific date, time, and location, and may provide details about the event. Other users, such as contacts of the user, may comment on the event, such as an intent of a guest to attend or skip the event. The social network may therefore facilitate the advertising of the event to the contacts of a user and communication among guests about the event and the set of potential attendees.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

While contemporary social networks may facilitate a user in advertising an event, contemporary social networks do not significantly assist a set of users in deciding on the details of an event. For example, an event may have many details, such as a time, a place, an event location, and a set of activities to be performed. The social network may permit a user who is responsible for the event (such as the creator of the event) to specify the details, and to alter the details based on changing circumstances, but may not promote the decisions of guests in proposing, considering, and selecting the details of the event. For example, a contemporary social network may permit a user to propose a group dinner at a particular date, time, and restaurant, but may not permit the user to propose the idea of a group dinner with some or all undetermined event details for which guests may propose suggestions, such as a proposed date or time, a proposed restaurant, or a restaurant type. That is, social networks may be proficient at allowing a user to advertise an event for which event details have been settled, but may not be proficient at allowing a set of users to plan an event together.

Presented herein are techniques for configuring a device within a social network to facilitate a set of users, such as a user and a set of contacts, to plan an event together. According to these techniques, a user of the social network may propose an event plan, such as a shared meal, a party, or a trip, and a set of contacts within the social network to be invited to attend the event. The social network may then extend invitations to the contacts, and may accept and store from the guests (including the user who created the event and the contacts who have been invited to attend) event plan suggestions for various details of the event plan, such as a date, time, duration, location, other individuals to invite, and activities to be performed. The social network may then present the event plan (including the event plan suggestions for various event plan details) to a guest of the event plan who wishes to view the current event plan suggestions, to participate in the planning of the event, and/or to consider participating in the event. Guests may also contribute event plan suggestions such as search results generated by a search engine, such as links to menus of restaurants in the area of the guests and a map illustrating the locations of restaurants suggested by the guests. The social network may also facilitate the planning of the event, e.g., by providing a mechanism for allowing guests to vote on various proposals in order to reach a consensus on event plan suggestions for various event plan details, and/or by recommending particular event plan suggestions (e.g., comparing user ratings of respective restaurants suggested for a meal shared among the guests, and choosing a restaurant having a suitably high user rating). In this manner, the social network may assist in the suggestion, consideration, and selection of event plan details of the event plan among the users of the social network.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
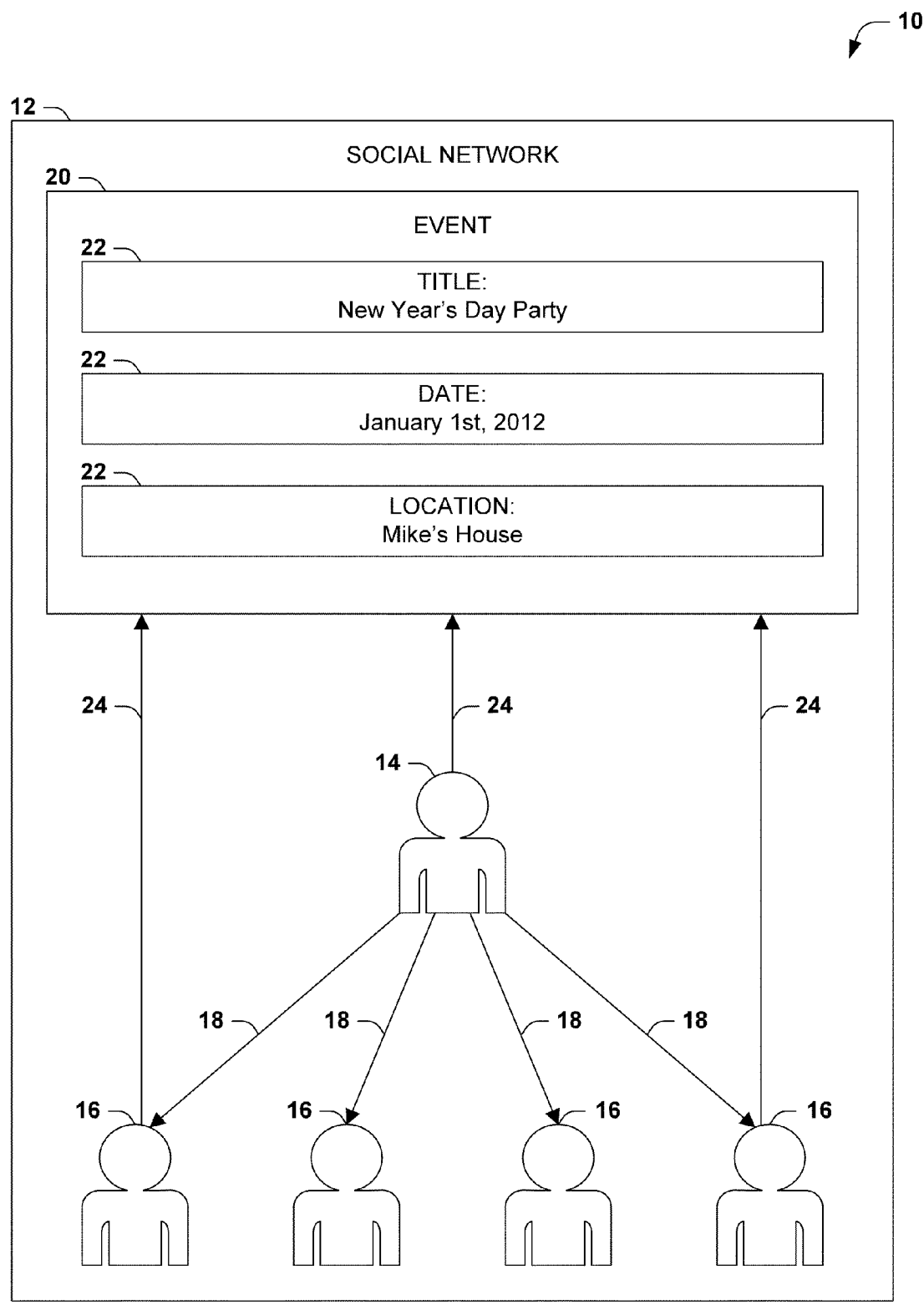
FIG. 1 is an illustration of an exemplary scenario featuring an event for a group of users of a social network.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

Within the field of computing, many scenarios involve a social network comprising a representation of a set of individuals and relationships thereamong. Such relationships may represent, e.g., familial relations, friendships, shared membership in a group or activity, or academic or professional relationships. The social network may permit a user to establish a set of contacts with whom the individual shares a relationship. Each user may then create a set of content items, such as personal status messages, commentaries on particular topics, links to other items of interest (such as hyperlinks to web pages and other resources), media objects such as images, and messages to one or more contacts. These contact items may be viewed by the contacts of the user, who may respond with other content items (e.g., comments on items posted by the user). The social network may facilitate these interactions by promoting the establishment of relationships, exchanging messages and notifications, and extending access to a user's content items for the contacts of the user while restricting access by other individuals in order to protect the privacy of the user.

Within a social network, a set of users may wish to create an event. This event may represent, e.g., an offline meeting, an online activity, a memorable occasion such as a holiday, or an activity or concept to which each guest of the event may attend on a particular day and/or time. A user of the social network may therefore create an event within the social network, e.g., by posting a set of event details such as the date, time, location, and a description of the intent of the event and the activities to be performed there. This event may be viewable by the contacts of the user, who may submit event attendance indicators (e.g., RSVP indicators) to indicate whether or not each contact intends to attend the event. The guests may also submit comments relating to the event.

FIG. 1 presents an exemplary scenario 10 featuring a social network 12 comprising a set of individuals, including a user 14 who has established relationships 18 with a set of contacts 16. Within the social network, the user 14 may create an event 20, such as a holiday party, and featuring a set of event details 22 that describe various aspects of the event 20 (e.g., a title, a date including a time, and an event location). For some or all of the contacts 16 of the user 14, the user 14 may send an invitation 24 to the event 20. In some such scenarios 10, the social network 12 may restrict the event 20 to contacts 16 whom the user 14 has invited, and may also permit the contacts 16 to invite other individuals represented in the social network, but in other such scenarios 10, the social network 12 may share the event 20 with any individual who is represented within the social network 12. In either case, the user 14 and his or her contacts 16 who have been invited to the event 20 (the "guests" of the event 20) may view the event details 22 of the event 20, may submit comments regarding the event 20, and/or may submit an attendance indicator to indicate whether or not the guest intends to attend the event 20.

While the exemplary scenario 10 of FIG. 1 may be useful for representing an event 20 and extending access to the event 20 to a set of guests, this model for events 20 within social networks 12 may be less helpful for the planning of events 20. That is, the exemplary scenario 10 of FIG. 1 may be advantageous for presenting events 20 for which the event details 22 are well-settled, and may permit the user 14 who created the event 20 to edit the event details 22 after creation; however, this model for events 20 is not particularly effective for assisting the guests in choosing the event details 22 of the event 20. For example, if the user 14 proposes a general activity to be shared with a set of contacts 16, such as a shared dinner at a restaurant, the social network 12 may accept a set of event details 22 specified by the user 14, and may permit the user 14 to change such event details 22 at a later date, but the social network 12 does not assist the guests in choosing event details 22 of this event 20, such as the date including the time and the selection of a restaurant. The guests might discuss the event details 22 using the social network 12 in an unstructured manner (e.g., by exchanging various comments that may be associated and displayed with the event 20), and if the guests reach a consensus about an event detail 22, the social network 12 may permit the user 14 who created the event 20 to change the updated event details 22. However, in many conventional social networks 12, this process is unstructured and mainly implemented by the user 14 who created the event 20, because the social network 12 does not facilitate the selection of event details 22 among the guests of the event 20.

Presented herein are techniques for providing a social network 12 (such as a configuration of one or more servers that store and present the data comprising the social network 12) that facilitates event planning among a set of users 14. In accordance with these techniques, a social network 12 may permit a user 14 to create an event plan, comprising a set of event details to be determined by the guests of the event 20. For example, in contract with the exemplary scenario 10 of FIG. 1 where the user 14 specifies the event details 22 (e.g., the event 20 is to occur at a particular date, time, and location), a user 20 may instead be permitted to specify an event plan comprising a set of event details to be determined, such as the date and time of the event 20 and the location of the event 20. The user 14 may then invite a set of contacts 16, and the user 14 and contacts 16 (together comprising the "guests" of the event plan) may submit event plan suggestions to the social network 12 to suggest respective event details 22 of the event 20. The social network 12 may track the event plan suggestions, and may present the event plan suggestions to the guests upon request. The social network 12 may also facilitate the selection of a particular event plan suggestion among a set of alternatives, e.g., by permitting guests to vote among the event plan suggestions and by presenting (as an event detail 22) the event plan suggestion having the highest number of votes.

Figure 2:
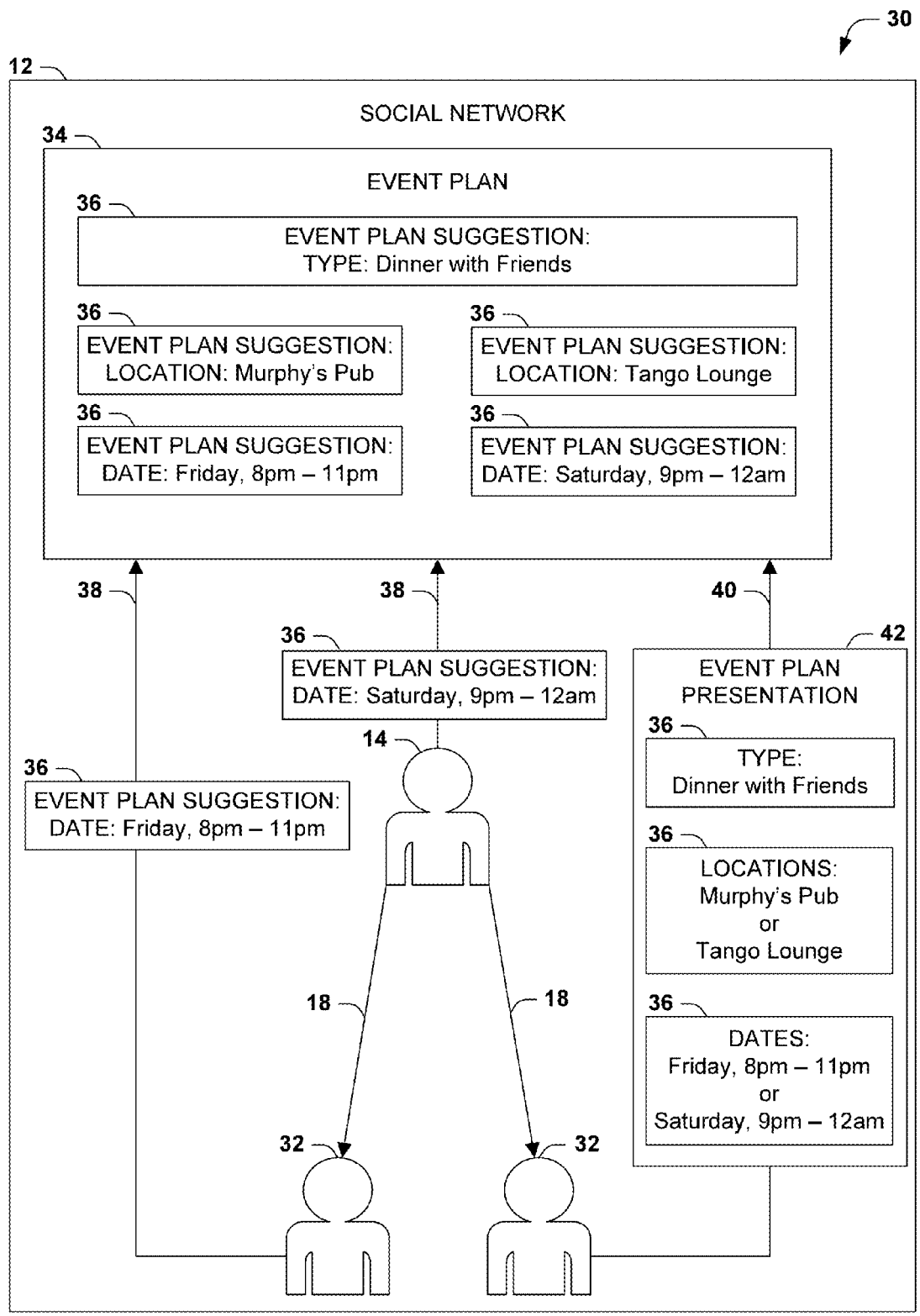
FIG. 2 is an illustration of an exemplary scenario featuring an event plan formulated among a set of users of a social network in accordance with the techniques presented herein.

FIG. 2 presents an exemplary scenario 30 featuring a social network 12 that facilitates the creation of an event plan 34 among a set of users 14 in accordance with the techniques presented herein. In this exemplary scenario 30, a user 14 may create an event plan 34 for an event 20 for which event details 22 are to be determined, such as the date and time of the event 20 and the location of the event 20. In contrast with the exemplary scenario 10 of FIG. 1, wherein the user 14 specifies particular event details 22 of the event 20 (e.g., "I propose a group dinner at a particular restaurant on a particular date"), in the exemplary scenario 30 of FIG. 2, the user 12 specifies that the guests 32 of the event 20 may together decide on the event details 22. Once one or more contacts 16 have been selected by the user 14 to join the event plan 34, the social network 12 may invite the contacts 16 to join the event plan 34 as guests 32 (e.g., by sending to respective contact 16 a notification of the creation of the event plan 34 and a link to a web page where the event plan 34 may be accessed). The guests 32 (including the user 14 who created the event plan 34) may submit a set of event plan suggestions 36 that may be tracked by the social network 14. For example, a first guest 32 may submit an event plan suggestion 36 to host the dinner on a particular date (e.g., a Friday evening), while a second guest 32 may submit an event plan suggestion 36 to host the dinner on a different date (e.g., the following Saturday evening). Event plan suggestions 36 for two or more locations (such as restaurants) where the event 20 may be held may also be submitted by different guests 32, or even by the same guest 32 (e.g., alternative suggestions for attending two different restaurants). The social network 14 may track these event plan suggestions 36 for the event 34, and may present the entire set of event plan suggestions 36 in order to inform a guest 32 of optional and possibly alternative event details 22 for the event 20 that are under consideration. The social network 14 may also assist the guests 32 in reaching a consensus on one or more event plan suggestions 36. For example, the social network 14 may allow guests 32 to vote on various event plan suggestions 36, may identify an event plan suggestion 36 having the highest number of votes, and may finalize particular event plan suggestions 36 as event details 22 (e.g., upon receiving a majority number of votes among the guests 32 for a particular event plan suggestion 36, or if only one event plan suggestion 32 is received for a particular event detail 22). The social network 12 may then present the selected event plan suggestions 36 of the event plan 34 as the event details 22 of the event 20. In this manner, the social network 12 facilitates the guests 32 of the event in selecting the event details 22 of the event 20 in accordance with the techniques presented herein.

Figure 3:
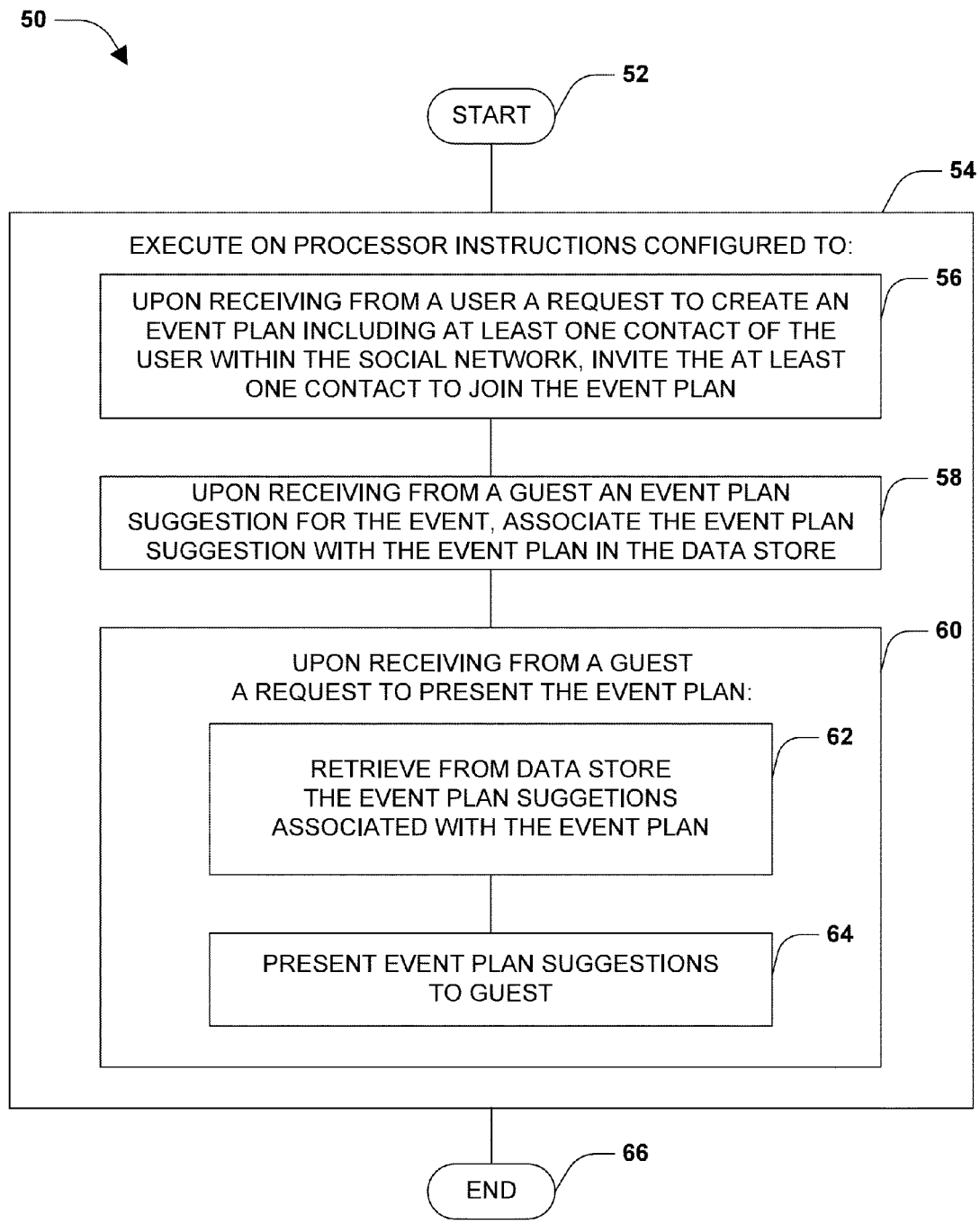
FIG. 3 is a flow chart illustrating an exemplary method of presenting an event plan to a user of a social network.

FIG. 3 presents a first embodiment of these techniques, illustrated as an exemplary method 50 of presenting an event plan 34 to a user 14 of a social network 12. The exemplary method 50 may be implemented, e.g., by storing a set of instructions to be executed on a processor of a device a data store (such as system RAM, a platter of a hard disk drive, a solid-state storage device, or a magnetic or optical disc). The exemplary method 50 begins at 52 and involves executing 54 on the processor the instructions configured to implement the techniques presented herein. In particular, the instructions are configured to, upon receiving from a user 14 a request to create an event plan 34 including at least one contact 16 of the user 14 within the social network 12, invite 56 the at least one contact 16 to join the event plan 34. The instructions are also configured to, upon receiving from a guest 32 an event plan suggestion 36 for the event plan 34, associate 58 the event plan suggestion 36 with the event plan 34 in the data store. The instructions are also configured to, upon receiving 60 from a guest 32 a request to present the event plan 34, retrieve 62 from the data store the event plan suggestions 36 associated with the event plan 34, and present 64 the event plan suggestions 36 to the guest. 32. In this manner, the exemplary method 50 implements the techniques presented herein (as depicted in the exemplary scenario 30 of FIG. 3), and so ends at 66.

Figure 4:
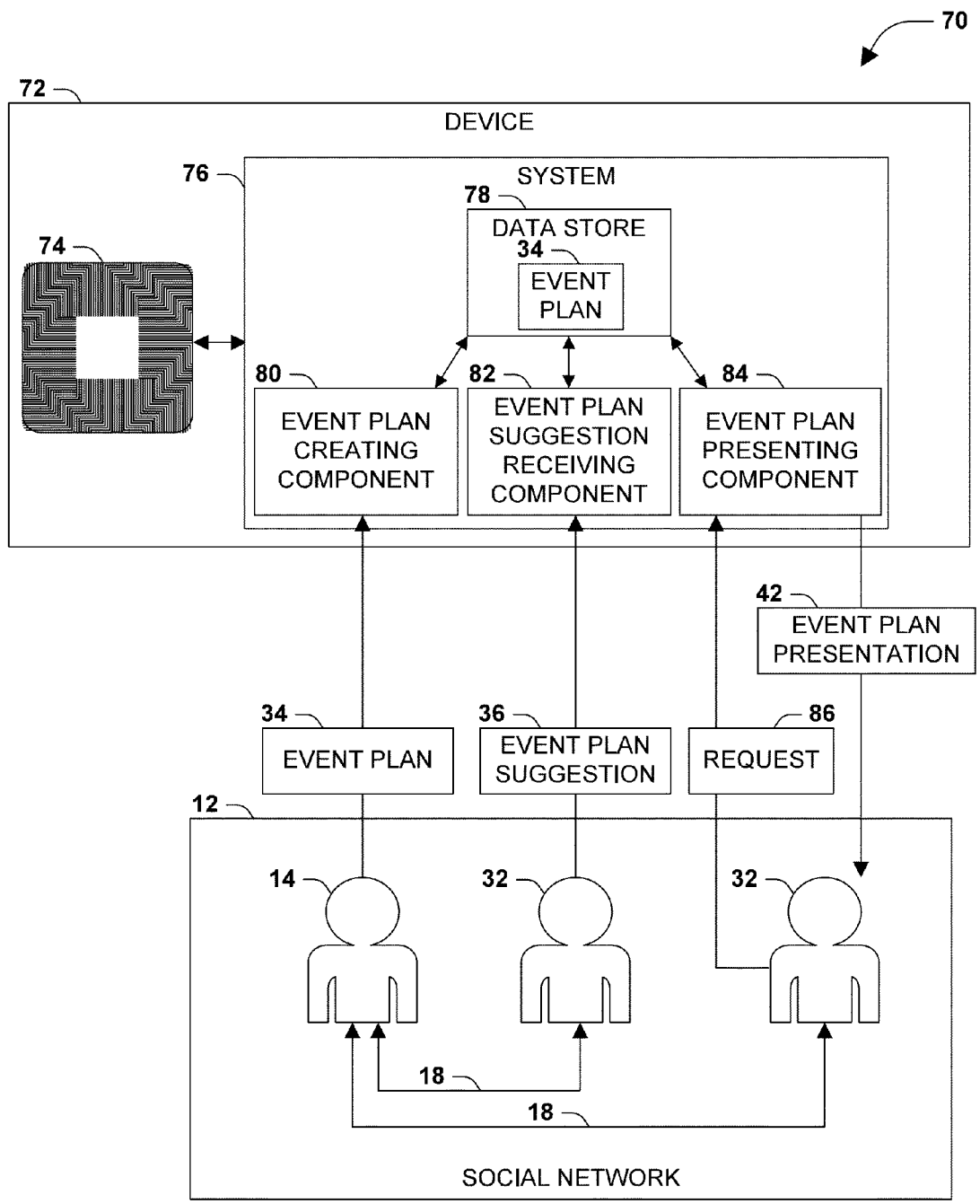
FIG. 4 is a component block diagram illustrating an exemplary system for presenting an event plan to a user of a social network.

FIG. 4 presents a second embodiment of these techniques, illustrate as an exemplary system 76 configured to present event plans 34 to users 14 of a social network 12. The exemplary system 76 may be implemented, e.g., as a software architecture comprising a set of interoperating components, where each component, comprising a set of software instructions executed on a processor 74 of a device 72 (such as a server of the social network 12), performs an aspect of the techniques presented herein. The exemplary system 76 comprises a data store 78, which is configured to store the event plan 34 (including the event plan details 36). The exemplary system 76 also comprises an event plan creating component 80, which is configured to, upon receiving from a user 14 a request to create an event plan 34 including at least one contact 16 of the user 14 within the social network 12, store the event plan 34 in the data store 78 and invite the at least one contact 14 to join the event plan 34 as a guest 32. The exemplary system 76 also comprises an event plan suggestion receiving component 82, which is configured to, upon receiving from a guest 32 an event plan suggestion 36 for the event plan 34, associate the event plan suggestion 36 with the event plan 34 in the data store 78. The exemplary system 76 also comprises an event plan presenting component 84, which is configured to, upon receiving from a guest 32 a request to present the event plan 34, retrieve from the data store 78 the event plan suggestions 36 associated with the event plan 34, and present the event plan suggestions 36 to the guest. 32 as an event plan presentation 42. In this manner, the exemplary system 76 facilitates the guests 32 of the event plan 34 in submitting event plan suggestions 36 that may eventually comprise the event details 22 of the event 20.

Still another embodiment involves a computer-readable medium comprising processor-executable instructions configured to apply the techniques presented herein. Such computer-readable media may include, e.g., computer-readable storage media involving a tangible device, such as a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD-R, DVD-R, or floppy disc), encoding a set of computer-readable instructions that, when executed by a processor of a device, cause the device to implement the techniques presented herein. Such computer-readable media may also include (as a class of technologies that are distinct from computer-readable storage media) various types of communications media, such as a signal that may be propagated through various physical phenomena (e.g., an electromagnetic signal, a sound wave signal, or an optical signal) and in various wired scenarios (e.g., via an Ethernet or fiber optic cable) and/or wireless scenarios (e.g., a wireless local area network (WLAN) such as WiFi, a personal area network (PAN) such as Bluetooth, or a cellular or radio network), and which encodes a set of computer-readable instructions that, when executed by a processor of a device, cause the device to implement the techniques presented herein.

Figure 5:
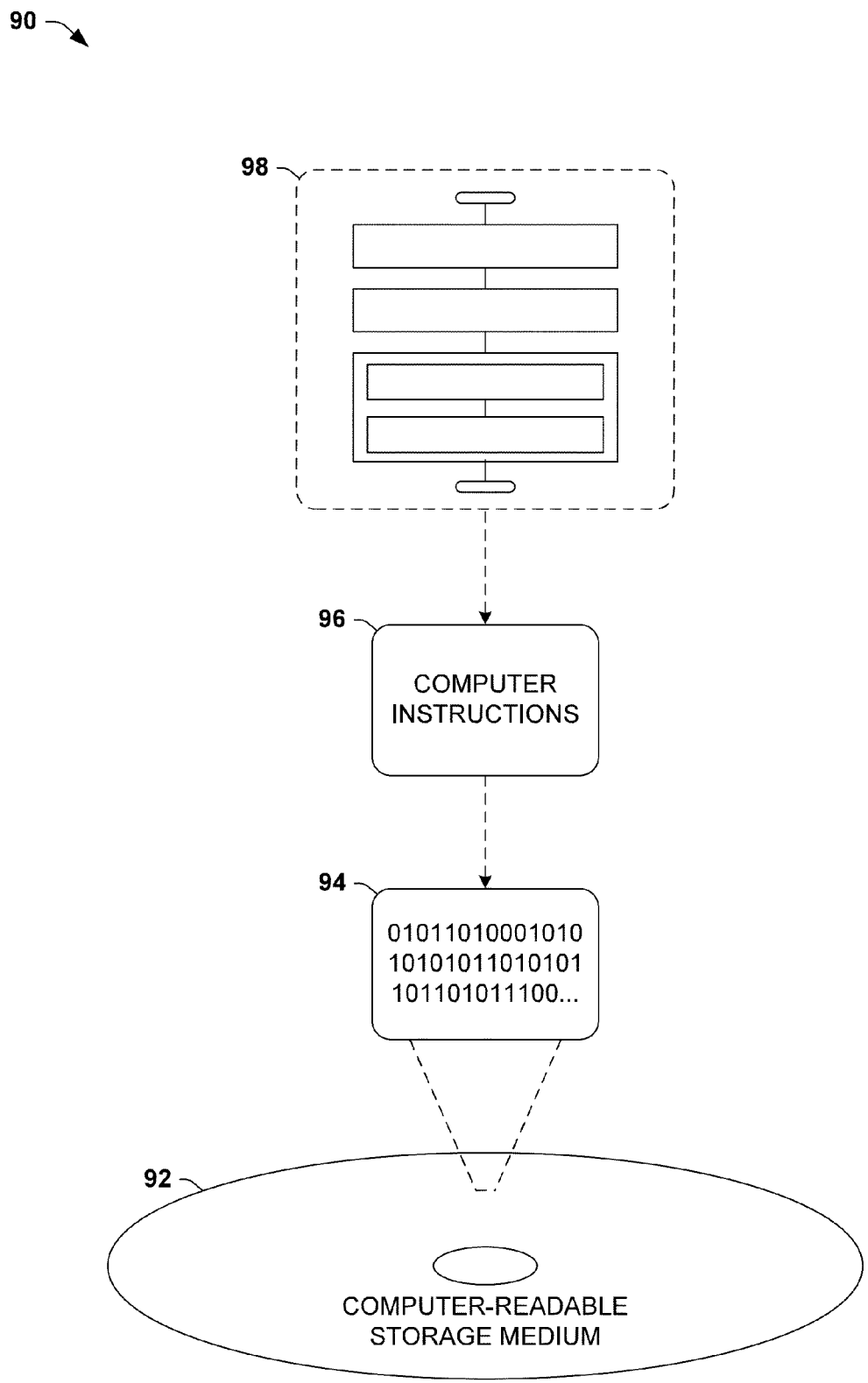
FIG. 5 is an illustration of an exemplary computer-readable medium comprising processor-executable instructions configured to embody one or more of the provisions set forth herein.

FIG. 5 presents a third embodiment 90 of these techniques, illustrated as an exemplary computer-readable storage medium 92 (e.g., a CD-R, DVD-R, or a platter of a hard disk drive), on which is encoded computer-readable data 94. This computer-readable data 94 in turn comprises a set of computer instructions 96 configured to operate according to the principles set forth herein. In one such embodiment, the processor-executable instructions 96 may be configured to perform a method of presenting an event plan to a user of a social network, such as the exemplary method 50 of FIG. 3. In another such embodiment, the processor-executable instructions 96 may be configured to implement a system for presenting an event plan to a user of a social network, such as the exemplary system 76 of FIG. 4. Some embodiments of this computer-readable storage medium 90 may comprise a nontransitory computer-readable storage medium (e.g., a hard disk drive, an optical disc, or a flash memory device) that is configured to store processor-executable instructions configured in this manner. Many such computer-readable media may be devised by those of ordinary skill in the art that are configured to operate in accordance with the techniques presented herein.

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the exemplary method 50 of FIG. 3 and the exemplary system 76 of FIG. 4) to confer individual and/or synergistic advantages upon such embodiments.

A first aspect that may vary among embodiments of these techniques relates to the scenarios wherein such techniques may be utilized. As a first example, these techniques may be applied to many types of social networks 12, including social networks representing real-world relationships such as familial relations and friendships; academic social networks representing connections among students and teachers; professional social networks representing professional associations among colleagues; and themed social networks representing connections among users 14 sharing an interest, such as participation in an online game. As a second example of this first aspect, the event plan 34 may be public (viewable by any user 14 of the social network 12, and possibly letting any such user 14 join the event plan 34 as a guest 32) and/or private (e.g., only accessible to guests 32 of the event plan 34). As a third example of this first aspect, these techniques may be utilized to facilitate the planning of many types of events 20, such as real-world meetings in a particular location; a distributed activity taking place in various locations; a commemorative event, such as a holiday; or an online activity. Those of ordinary skill in the art may devise many types of scenarios wherein the techniques presented herein may be utilized.

A second aspect that may vary among embodiments of these techniques relates to the creation of an event plan 34 by a user 14. As a first example, a user 14 may specify a completely empty event plan 34, simply indicating that a particular set of guests 32 (including the user 14 and a designated set of contacts 16) may decide to participate in an activity together. Alternatively, the user 14 may specify one or more event plan suggestions 36 while creating the event plan 34, e.g., some initial suggestions for the event plan 34 that may be taken under consideration by the guests 32.

As a second example of this second aspect, the user 14 creating the event plan 34 may specify one or more event plan details for the event plan 34. These event plan details may add some structure to the event plan 34, such as particular types of event details 22 of the event 20 that are to be determined by the guests 32 through the submission of event plan suggestions 36. Guests 32 may then submit event plan suggestions 36 relating to one or more event plan details of the event plan 34. For example, a user 14 may create an event representing a dinner to be shared among a group of contacts 16, and comprising a first event plan detail indicating a to-be-determined date and time of the event 20; a second event plan detail indicating a to-be-determined location of the event 20 (such as a restaurant); and a third event plan detail indicating a to-be-determined type of food to be consumed at the event 20. Guests 32 may then submit event plan suggesting 36 relating to one or more of the event plan details of the event plan 34. The inclusion of event plan details may therefore add structure to the event plan 34, such that event plan suggestions 36 may be grouped and considered according to different event plan details (e.g., event plan suggestions 36 relating for the date of an event 20 may be grouped and considered together, and event plan suggestions 36 relating to an event location of the event 20 may also be grouped and considered together). Such event plan details (representing various to-be-determined aspects of an event 20) may be selected from a set of event plan details including an event title detail (e.g.; an event type detail (e.g., the type of event 20); an event guest detail (e.g., particular guests 32 to be invited to the event 20 by the current guests 32); an event date time detail (e.g., a date and time of the event 20); an event duration detail; an event location detail (e.g., an area of town, or a general type of location where the event 20 may be held, such as a meal in a residence, a picnic held in a park, or a meal at a restaurant); an event venue detail (e.g., a particular location where the event 20 is to be held); and an event activity detail (e.g., a particular activity to be performed by the guests 32 at the event 20).

An additional variation of this second example of this second aspect relates to the use of event plan templates. For example, a device configured according to the techniques presented herein (such as a server of a social network) may store one or more event plan templates, each of which may specify a particular set of event plan details for event plans 34 of a particular event type. As one such example, the device may store a first event plan template for a shared meal among a set of friends, which may include such event plan details as a date, a general area for the meal (e.g., an area of a town where the friends reside), a type of restaurant and/or cuisine, and a price range, and a second plan event plan template for a party, which include such event plan details as a date, a duration, a theme for the party, and the types of activities to be performed at the party. When a user 14 creates an event plan 34, the device may permit the user 14 to specify an event type, and may automatically associate with the event plan 34 a set of event plan details that are appropriate for the event plan 34 based on the selected event type.

Figure 6:
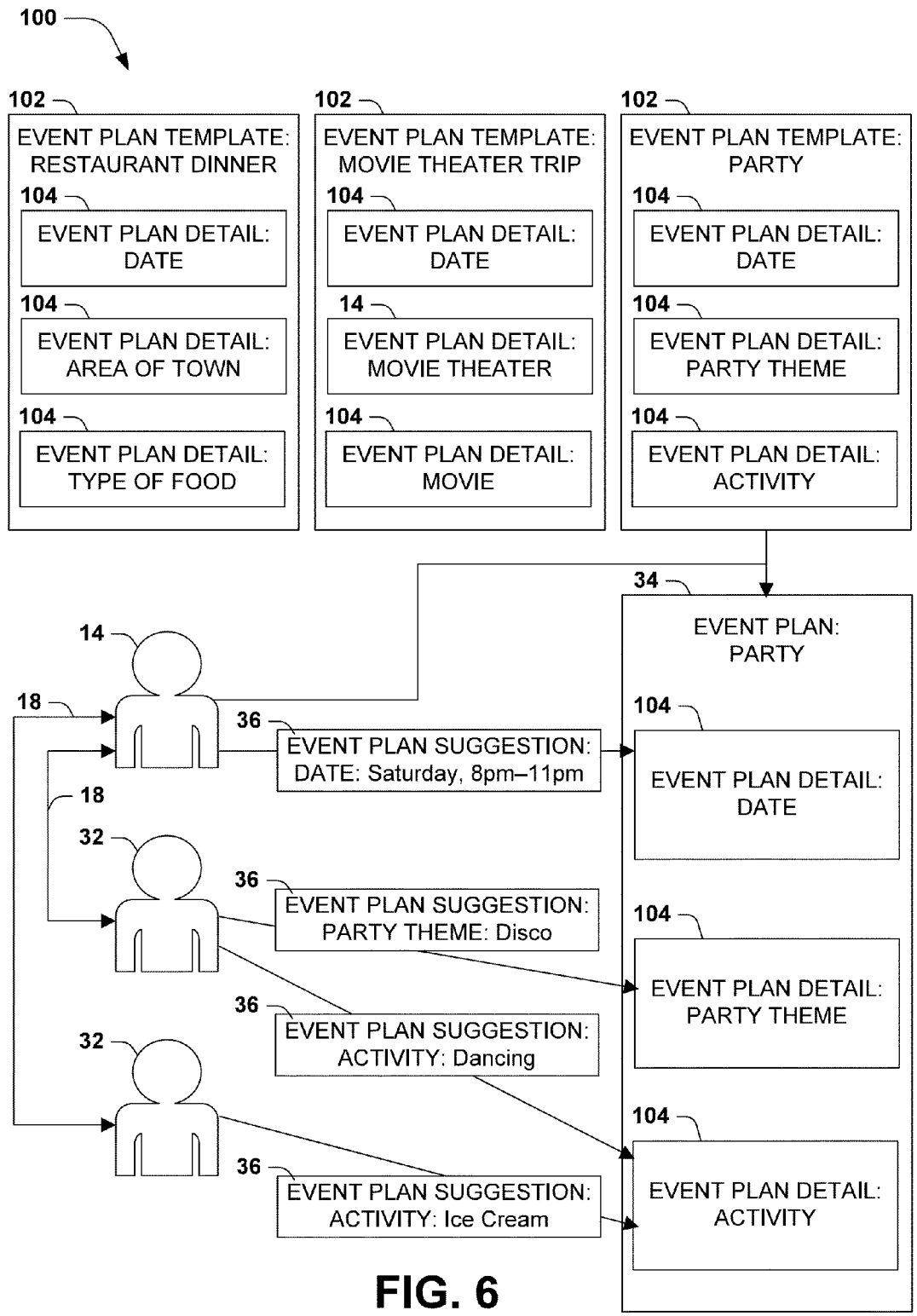
FIG. 6 is an illustration of an exemplary scenario featuring an event plan based on an event plan template comprising event plan details for which guests of the event plan submit event plan suggestions.

FIG. 6 presents an exemplary scenario 100 featuring event plan templates 102 that may be used to facilitate the creation of event plans 34 of particular event types. In this exemplary scenario 100, a device stores a set of event plan templates 102 for various event types, such as a restaurant dinner, a trip to a movie theater, and a party. Each event plan template 102 includes a set of event plan details 104 that are suitable for events of the corresponding event type. When a user 14 creates an event plan 34, the user 14 may specify an event type, and the device may select the corresponding event plan template 102 from which the event plan 34 may be created, thus automatically associating with the event plan 34 a suitable set of event plan details 104 to be determined among the guests 32 of the event plan 34. For example, when the user 14 selects a "party" event type for a new event plan 34, the device may automatically select the event plan template 102 or the "party" event type, and based on this event plan template 102, may insert into the event plan 34 a set of event plan details 104 such as a date of the party, a party theme, and one or more activities to be performed at the party. Additionally, the guests 32 of the event plan 34 may submit event plan suggestions 36 associated with one or more of these event plan details 104. For example, a first guest 32 (such as the user 14 who created the event plan 34) may submit an event plan suggestion 36 associated with the event plan detail 104 representing the date and time of the party; and other guests 32 may submit event plan suggestions 36 associated with the event plan detail 104 representing activities to be performed at the party. Multiple event plan suggestions 36 may be associated with a particular event plan 34 in either an inclusive manner (e.g., multiple activities may be performed at the event 20) or an exclusive manner (e.g., alternative event plan suggestions 36 for the date and time of the event 20). In this manner, event plan details 104 may be utilized to structure the event plan 34 and the event plan suggestions 36, and event plan templates 102 may be utilized to provide a suitable set of event plan details 104 for an event plan 34 of a particular event type.

As a third example of this second aspect, the user 14 may specify contacts 16 to join an event plan 34 in many ways. For example, the user 14 may specify that all such users 14 may be invited as guests 32, or may designate a particular subset of contacts 16 among the entire set of contacts 16 of the user 14 within the social network 12. Such designation may be ad hoc (e.g., selected by the user 14 while creating the event plan 34) or may be based on one or more contact groups (e.g., a previously selected subset of contacts 16). The user 14 may also specify particular criteria for inviting guests 32 to join the event plan 34; e.g., the user 14 may invite as guests 32 all contacts 16 located within a specified proximity of the user 14, such as those currently located in the same city. Those of ordinary skill in the art may devise many ways of allowing users 14 to create event plans 34 and invite guests 32 while implementing the techniques presented herein.

A third aspect that may vary among embodiments of these techniques relates to the event plan suggestions 36 submitted by various guests 32 of an event plan 34. As a first example, the event plan suggestions 36 may comprise many types of items, such as unformatted text, formatted data types (e.g., a date primitive value), a media object such as an image, or a hyperlink to a resource (such as a website) that features the content of the suggestion, such as a website of a restaurant where the guest 32 suggests having dinner.

Figure 7:
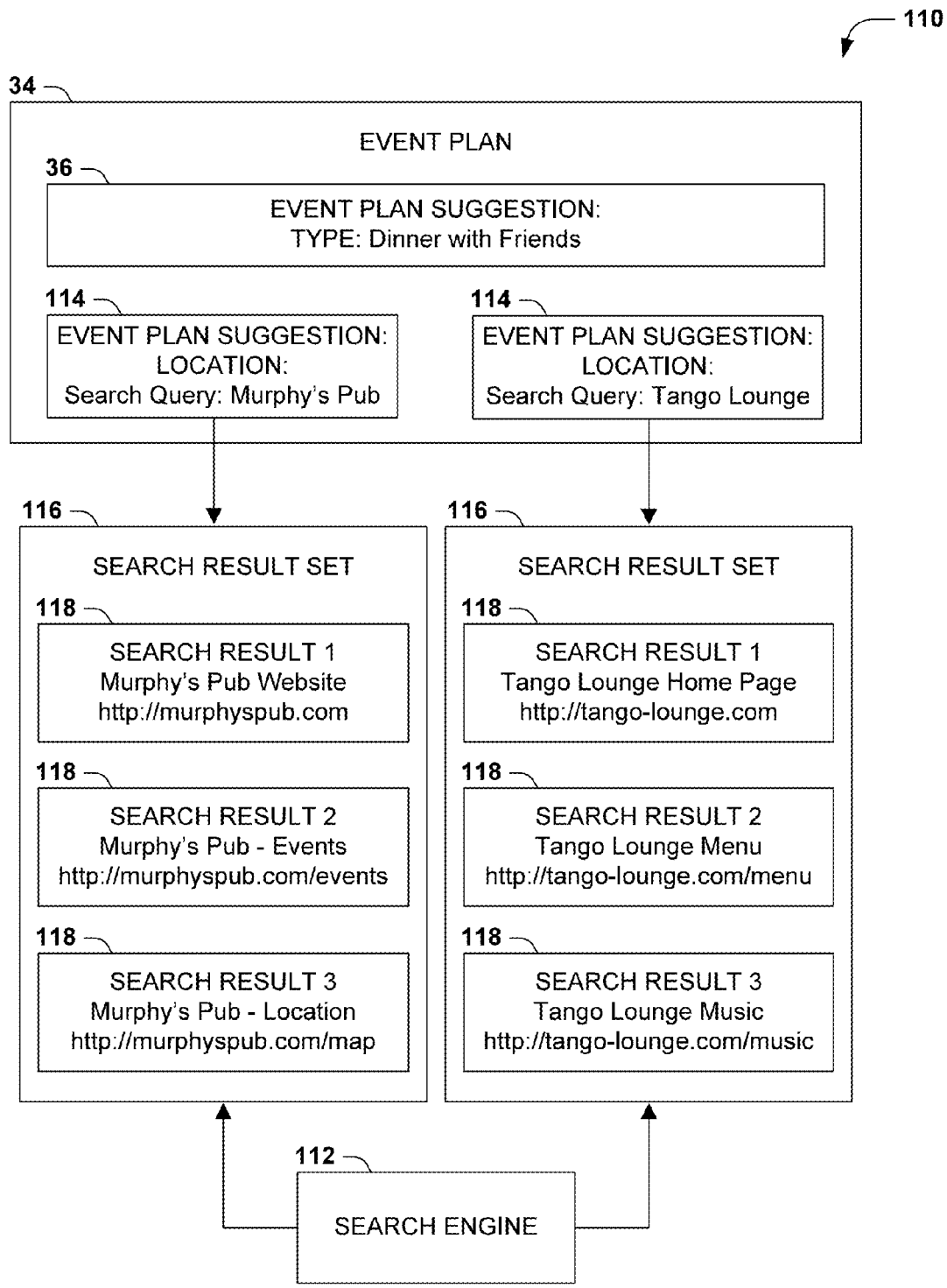
FIG. 7 is an illustration of an exemplary scenario featuring an event plan having event plan suggestions associated with search engine results.

FIG. 7 presents a particular variation of this first example of this third aspect, where event plan suggestions 36 may include search queries 114 to be applied to a search engine 112. For example, in formulating a particular event plan suggestion 36 for an event plan detail 104, a guest 32 may generate a search query 114 to be submitted to a search 112, and resulting in a search result set 116 comprising one or more search results 118 (e.g., a set of hyperlinks to web pages matching the terms of the search query 114). The guest 32 may then have to review the search results 118 and summarize the contents of the information presented therein (e.g., "I read that this restaurant just opened in town and has great food") in order to submit an event plan suggestion 36. However, it may be advantageous to allow the user 12 to submit the search query 114 to the social network 12 as an event plan suggestion 36 for the event plan 34. For example, the entire search query 114 may be submitted, and when a guest 32 requests to view the event plan 34, the social network 12 may execute the search query 114 on the search engine 112 and may include the search results 118 generated thereby in the event plan suggestions 36 presented with the event plan 34. Alternatively, the guest 32 may be permitted to select one or more search results 118 as event plan suggestions 36, and social network 12 may include the selected search results 118 in the set of event plan suggestions 36 presented with the event plan 34. In this manner, the social network 12 may directly incorporate search results 118 generated by search queries 114 formulated by guests 32 while seeking event plan suggestions 36 for the event plan 34. Moreover, if the event plan 34 includes a set of event plan details 104, the guest 32 may submit a particular search query 114 and/or search results 118 as an event plan suggestion 36 associated with one or more event plan details 104. For example, for an event plan 34 including "dinner and drinks," a guest 32 may submit a search query 114 and/or a search result 118 associated with a first event plan detail 104 involving an event location for sharing a dinner, and/or associated with a second event plan detail 104 involving an event location for having drinks after dinner.

As yet another variation of this first example of this third aspect, the social network 12 may automatically generate one or more search queries 114, and may automatically include one or more search results 118 as event plan suggestions 36 recommended by the social network 12. For example, if the event plan suggestions 36 indicate that the guests 32 are planning to have dinner in a particular area of a city on a particular date and wish to have a particular type of cuisine, the social network 12 may formulate an appropriate search query 114 for restaurants matching these criteria, and may include the search results 118 as event plan recommendations 36 in presentations of the event pan 34.

As a second example of this third aspect, a guest 32 of an event plan 34 may submit an event plan suggestion 36 as an alternative event plan suggestion for a particular event plan detail 104. For example, guests 32 may submit several event plan suggestions 36 for a particular event plan detail 104 that may be satisfied only by a limited number of event plan suggestions 36 (e.g., the guests 32 may have to choose one among several event plan suggestions 36 associated with a "date" event plan detail 104, and a subset of event plan suggestions 36 associated with an "activity" event plan detail 104 for an event that may only be long enough to include a few activities). Therefore, one or more event plan suggestions 36 may be regarded as alternative event plan suggestions 36 that are mutually exclusive with respect to a particular event plan detail 104. The social network 12 may denote the mutual exclusivity of two or more alternative event plan suggestions in presentations of the event plan 34 to guests 32 in order to encourage a selection thereamong.

In some variations of this second example of this third aspect, the social network 12 may assist the guests 32 in selecting among the alternative event plan suggestions. As a first example, guests 32 may submit alternative event plan suggestion votes that indicate a preference for a first alternative event plan suggestion over a second alternative event plan suggestion. The social network 12 may receive alternative event plan suggestion votes, and may store the votes in the data store 78, and may select and present a selected event plan suggestion based on the alternative event plan suggestion votes stored in the data store 78 (e.g., the alternative event plan suggestion having the highest number of votes, or all alternative event plan suggestions having a sufficiently high number of votes). As a second example, the social network 12 may identify a recommended alternative event plan suggestion; e.g., the event plan suggestions 36 offered by guests 32 for a shared meal may include a first restaurant that has been highly rated by patrons and a second restaurant that has been poorly rated by patrons, and the social network 12 may include such recommendations as recommended alternative event plan suggestions in presentations of the event plan 34.

Figure 8:
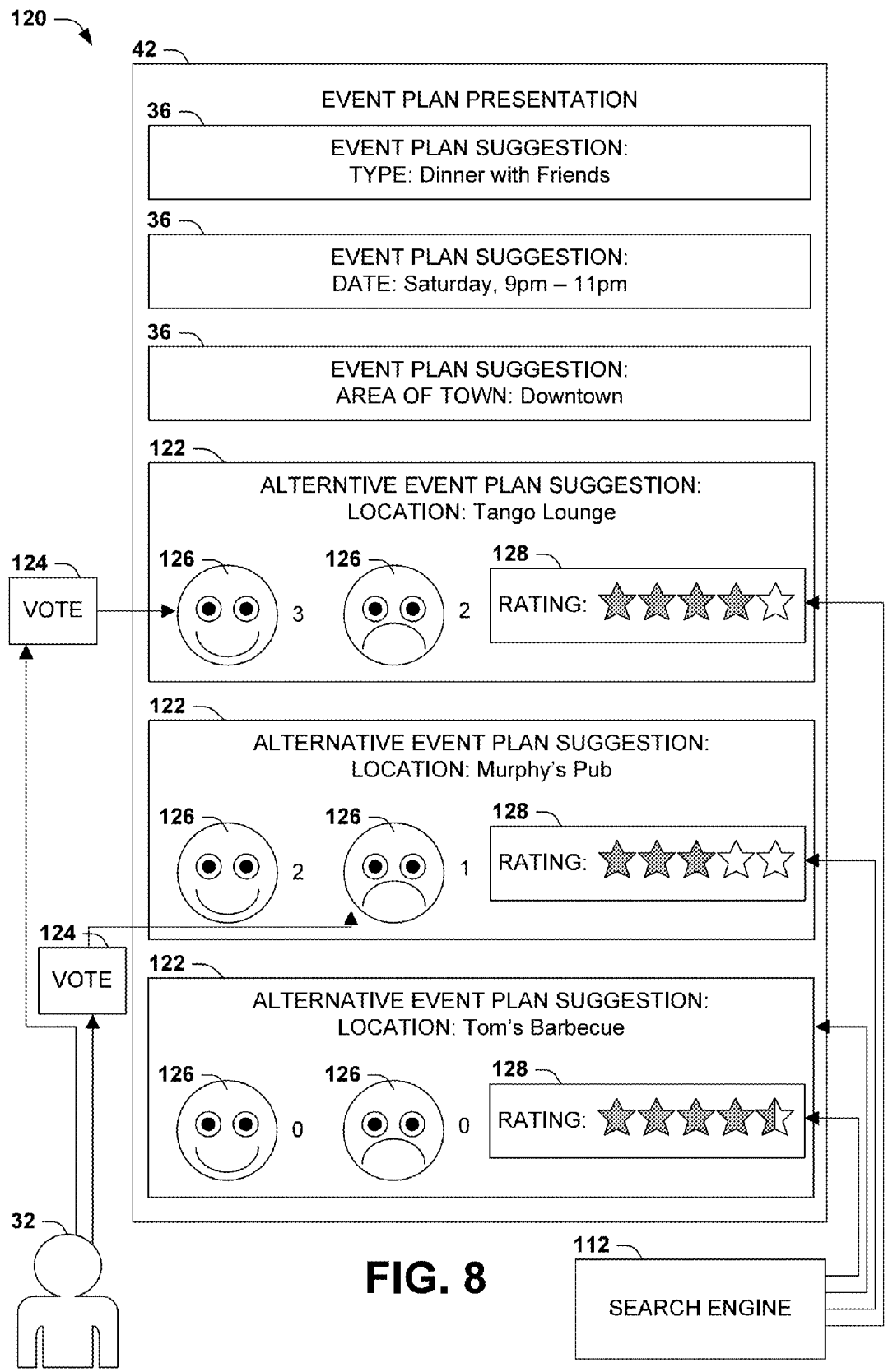
FIG. 8 is an illustration of an exemplary scenario featuring guests of an event plan voting among alternative event plan suggestions and recommendations among the alternative event plan suggestions by a search engine.

FIG. 8 presents an exemplary scenario 120 featuring a social network 12 configured to facilitate a selection among alternative event plan suggestions. This exemplary scenario illustrates a set of event plan suggestions 36 for various event plan details 104 of an event plan 34, where, for a particular event plan detail 104 (the location of a dinner event), a set of alternative event plan suggestions 122 have been submitted by various guests 32. In order to facilitate a selection among these alternative event plan suggestions 122, the social network 12 may receive and store alternative event plan suggestion votes 124 from various guests 32, and may include the alternative event plan suggestion votes 124 for respective alternative event plan suggestions 122 in event plan presentations 42 of the event plan 34. Additionally, the social network 12 may utilize a search engine 112 to identify a set of recommendations 128, such as ratings of the respective alternative event plan suggestions 122 that may have been submitted by other individuals. These recommendations 128 may also be incorporated into the event plan presentations 42 of the event plan 34 to facilitate the selection by the guests 32 of a selected event plan suggestions among the alternative event plan suggestions 122. Those of ordinary skill in the art may devise many ways of configuring the social network 12 to accept event plan suggestions 36 for an event plan 34 while implementing the techniques presented herein.

A fourth aspect that may vary among embodiments of these techniques relates to the presentation of an event plan 34 to a guest 32. As a first example, in addition to the event plan suggestions 36, the event plan presentation 42 may explicitly or implicitly indicate the event plan details 104 of the event plan 34, and may also explicitly or implicitly indicate the association of such event plan details 104 with one or more event plan suggestions 36. The event plan presentation 42 may also include an indication that one or more event plan suggestions 36 are alternative event plan suggestions 122 for a particular event plan detail 104 (e.g., indicating a mutual exclusivity of such event plan suggestions 36), and may also indicate a selected event plan suggestion thereamong (e.g., by including an indication of alternative event plan suggestion votes 124 and/or recommendations 128).

Figure 9:
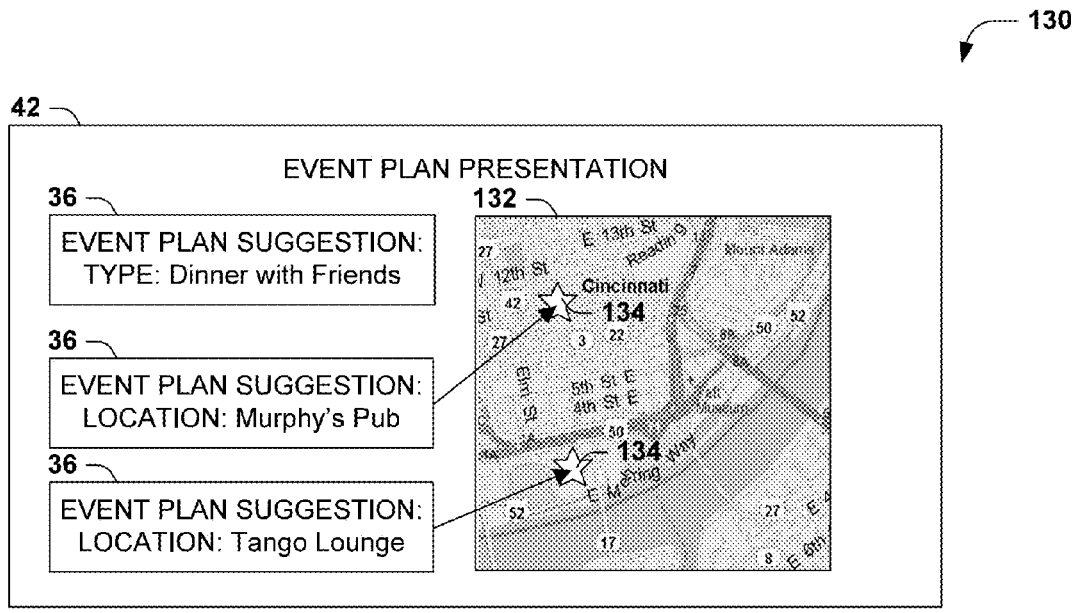
FIG. 9 is an illustration of an exemplary presentation of an event plan featuring a map depiction of locations.
Figure 10:
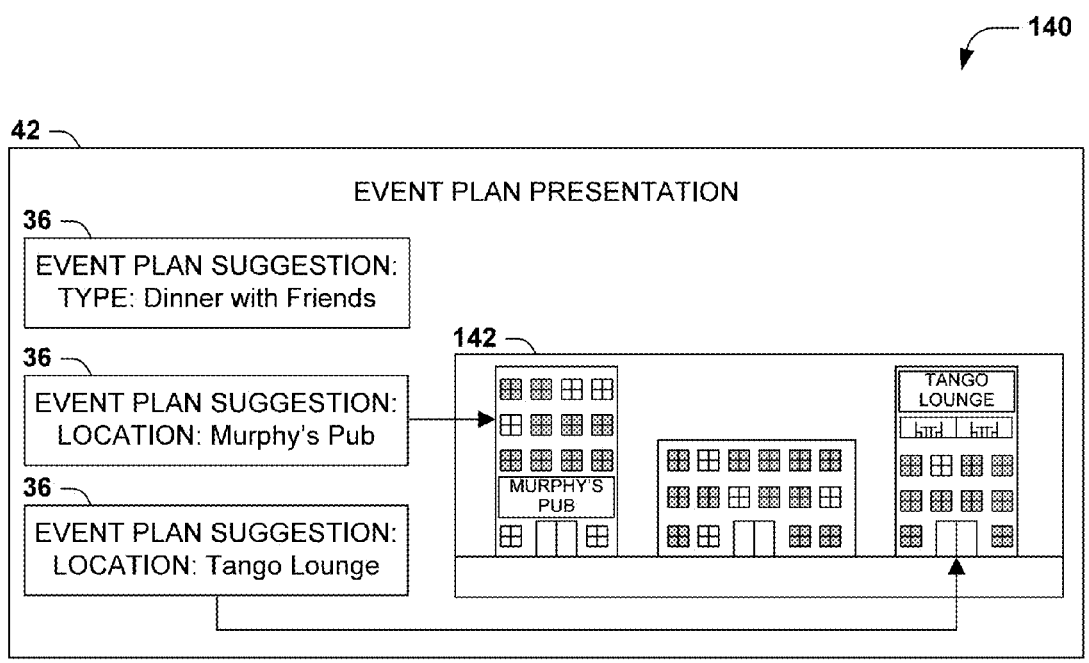
FIG. 10 is an illustration of an exemplary presentation of an event plan featuring a visual depiction of locations.

As a second example of this fourth aspect, an event plan 34 may be associated with one or more locations, and an event plan presentation 42 of an event plan 34 may include an indication of the locations involved in the event plan 34. As a first such example, FIG. 9 presents an illustration of an exemplary scenario 130 featuring a map 132 of various event plan suggestions 36 involved in an event plan 34 that includes indicators of the event locations 134. As a second such example, FIG. 10 presents an illustration of an exemplary scenario 140 featuring a visual depiction 142 of the event locations 134 associated with various event plan suggestions 36 for an event plan 34. This visual depiction 142 may be generated, e.g., based on images of the locations captured by individuals and stored in an image database, or by synthesizing a visual depiction thereof (e.g., a three-dimensional model of an event location). Those of ordinary skill in the art may devise many ways of presenting an event plan 34 to a guest 32 while implementing the techniques presented herein.

A fifth aspect that may vary among embodiments of these techniques relates to additional features that may be offered by the social network 12 in relation to the event plan 34, and that may be included by the social network 12 in event plan presentations 42 of the event plans 34. As a first example, guests may submit event plan comments associated with an event plan 34 (and possibly associated with a particular event plan detail 104 and/or event plan suggestion 36). Accordingly, the social network 12 may be configured to store received event plan comments in the data store 78 associated with the event plan 34, and to present the event plan comments associated with the event plan 34 as part of an event plan presentation 42. As a second example of this fifth aspect, guests 32 may submit event attendance indicators (e.g., RSVP indicators) associated with an event plan 34 to indicate whether or not the guest 32 plans to attend the event 20. Accordingly, the social network 12 may be configured to store received event attendance indicators in the data store 78 associated with the event plan 34, and to present the event attendance indicators associated with the event plan 34 as part of an event plan presentation 42.

As a third example of this fifth aspect, the social network 12 may receive and utilize a location of a guest 32, and may use the guest location in the event plan presentation 42. The guest location may comprise a current location of the guest 32 (e.g., detected by a global positioning service (GPS) receiver and reported to the social network 12) or a probabilistic location of the guest 32 (e.g., an address of a residence of a guest 32, or a location of the guest 32 identified based on a calendar of the activities of the guest 32). The guest location may be utilized, e.g., to include the guest location on a map 132 of the event plan 34, and/or to present a route that may facilitate the guest 32 in traveling to the event location.

Figure 11:
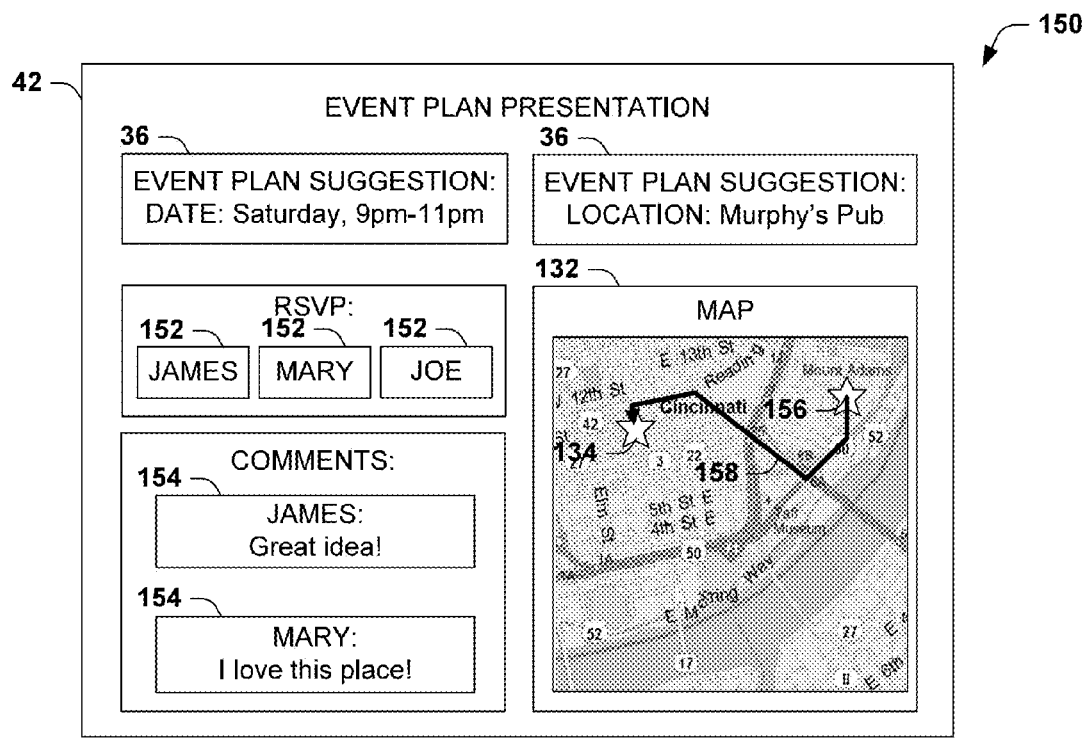
FIG. 11 is an illustration of an exemplary scenario featuring additional features that may be included in a presentation of an event plan, including attendance indicators, comments, and a route for a guest.

FIG. 11 presents an illustration of an exemplary scenario 150 featuring an event plan presentation 42 that includes several of these features. As a first example, in addition to presenting the event plan suggestions 36, the event plan presentation 42 includes a set of event attendance indicators 152 (e.g., RSVP indicators) submitted by various guests 42 to indicate a planned attendance at or absence from the event 20. As a second example, the event plan presentation 42 includes a set of event plan comments 154 submitted by various guests 32 relating to the event plan 34. As a third example, the event plan presentation 42 includes a map 132 including an indication of a guest location 156 of the guest 32 to whom the event plan 34 is being presented, and a route 158 that may facilitate the guest 32 in reaching the event 20.

As a fourth example of this fifth aspect, if an event plan 34 involves an event location 134, and if the social network 12 receives reports of guest locations 156 of various guests 32 (e.g., from global positioning service (GPS) receivers carried by respective guests 32), then the social network 12 may include the guest locations 156 in an event plan presentation 42. For example, the event plan presentation 42 may include a map 132 depicting the guest locations 156 recently detected for the guests 32. Additionally, if a proximity may be identified for the event location 134, the guest locations 156 may be utilized to identify the presence of guests 32 whose guest locations 156 are proximate to the event location 134, and an absence of guests 32 whose guest locations 156 are not proximate to the event location 134. For example, an event plan presentation 42 of the event plan 34 may include a list of present guests 32 and absent guests 32, and guests 32 may be notified when other guests 32 arrive at or depart from the event 20, based on the detected guest locations 156.

Figure 12:
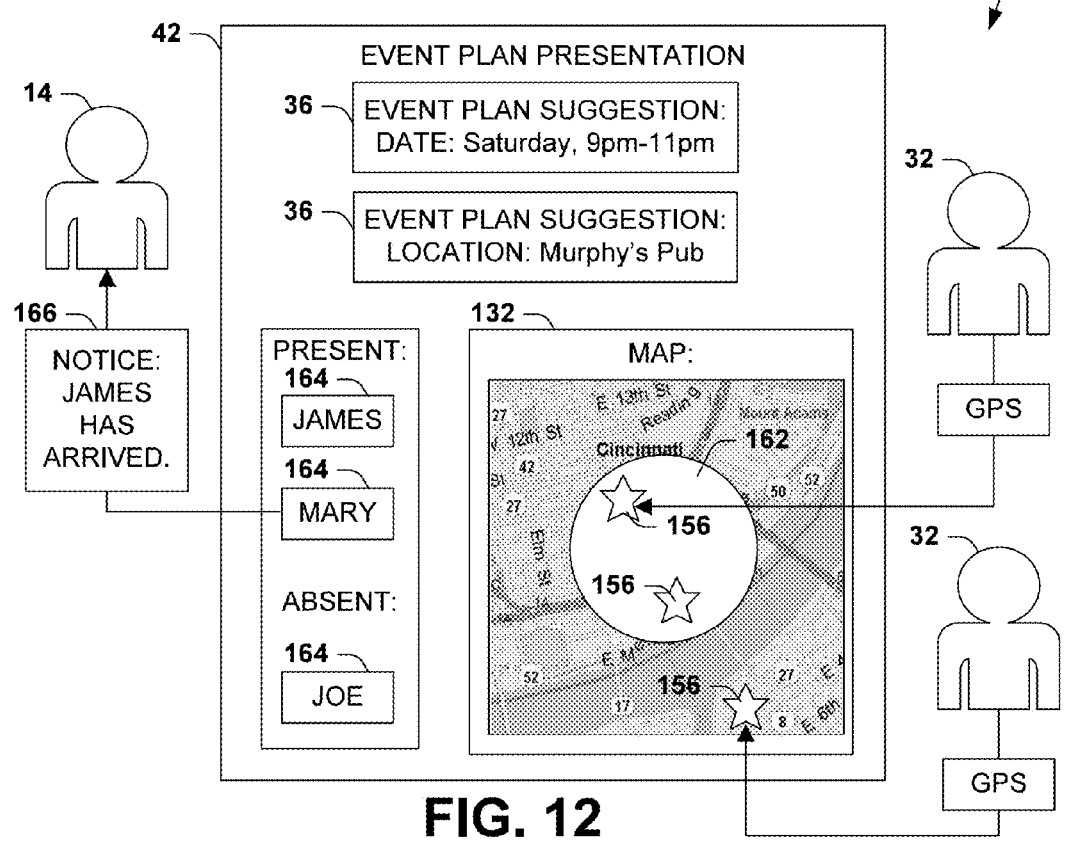
FIG. 12 is an illustration of an exemplary scenario featuring a geofencing and reporting of presence indicators for various guests of an event.

FIG. 12 presents an illustration of an exemplary scenario 160 featuring a "geofencing" aspect relating to a use of guest locations 156 in relation to an event location 134 of an event 20 described by an event plan 34. In this exemplary scenario 160, a map 132 may be generated indicating the event location 134 of the event 20 as well as the guest locations 156 of respective guests 32, as well as presence indicators 164 indicating the presence or absence of the guests 32 (based on the proximity of the guest locations 156 with respect to the event location 134). Additionally, when a first guest 32 enters the proximity of the event location 134 (based on the first guest location reported to the social network 12), a notification 166, such as an email message or a text message, may be sent to a second guest to notify the second guest of the arrival of the first guest. Those of ordinary skill in the art may devise many such additional features that may be added to the event planning of the social network 12 while implementing the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 13:
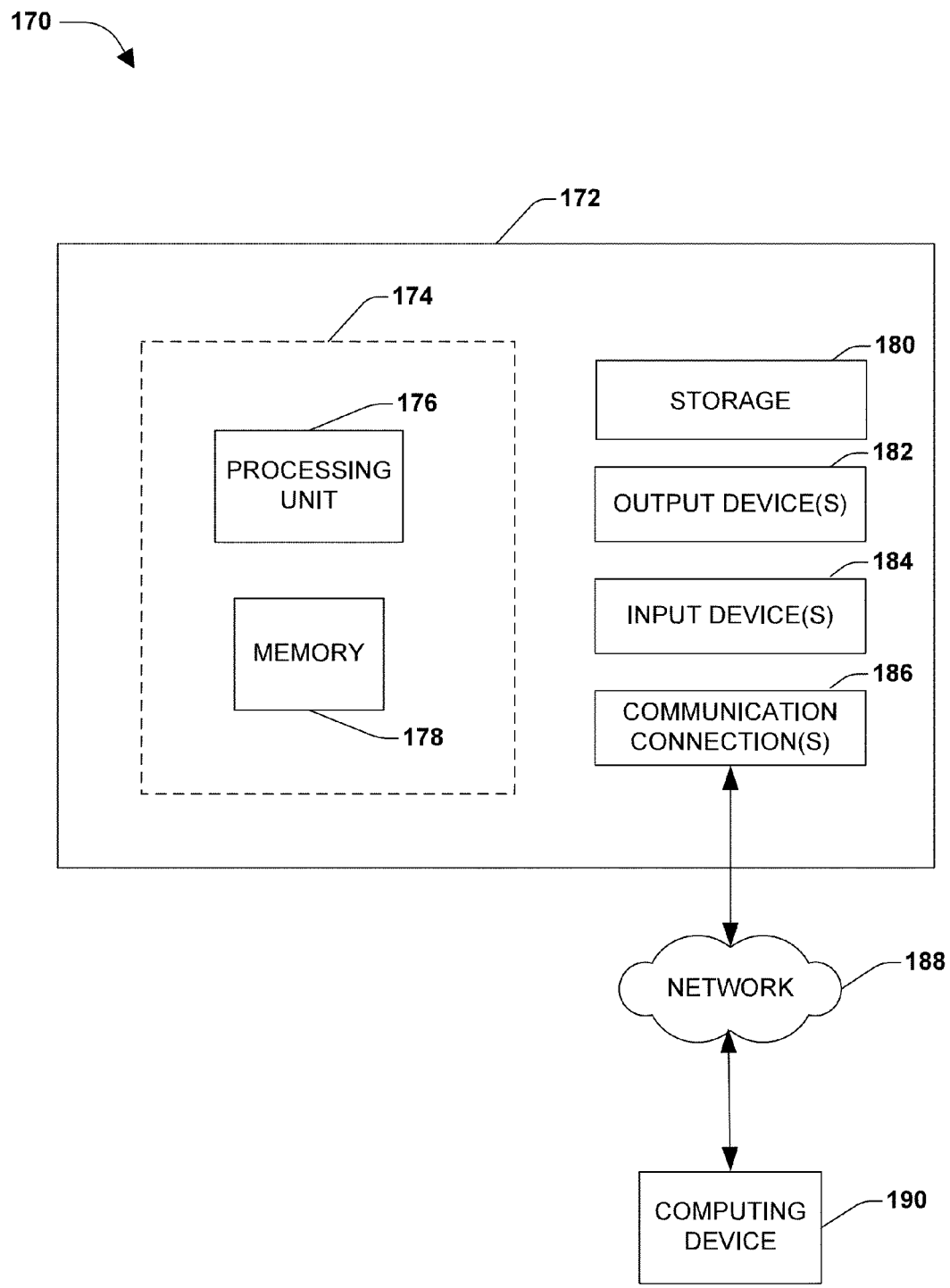
FIG. 13 is an illustration of an exemplary computing environment wherein one or more of the provisions set forth herein may be implemented.

FIG. 13 and the following discussion provide a brief, general description of a suitable computing environment to implement embodiments of one or more of the provisions set forth herein. The operating environment of FIG. 13 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 13 illustrates an example of a system 170 comprising a computing device 172 configured to implement one or more embodiments provided herein. In one configuration, computing device 172 includes at least one processing unit 176 and memory 178. Depending on the exact configuration and type of computing device, memory 178 may be volatile (such as RAM, for example), non-volatile (such as ROM, flash memory, etc., for example) or some combination of the two. This configuration is illustrated in FIG. 13 by dashed line 174.

In other embodiments, device 172 may include additional features and/or functionality. For example, device 172 may also include additional storage (e.g., removable and/or non-removable) including, but not limited to, magnetic storage, optical storage, and the like. Such additional storage is illustrated in FIG. 13 by storage 180. In one embodiment, computer readable instructions to implement one or more embodiments provided herein may be in storage 180. Storage 180 may also store other computer readable instructions to implement an operating system, an application program, and the like. Computer readable instructions may be loaded in memory 178 for execution by processing unit 176, for example.

The term "computer readable media" as used herein includes computer storage media. Computer storage media includes volatile and nonvolatile, removable and non-removable media implemented in any method or technology for storage of information such as computer readable instructions or other data. Memory 178 and storage 180 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 172. Any such computer storage media may be part of device 172.

Device 172 may also include communication connection(s) 186 that allows device 172 to communicate with other devices. Communication connection(s) 186 may include, but is not limited to, a modem, a Network Interface Card (NIC), an integrated network interface, a radio frequency transmitter/receiver, an infrared port, a USB connection, or other interfaces for connecting computing device 172 to other computing devices. Communication connection(s) 186 may include a wired connection or a wireless connection. Communication connection(s) 186 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 172 may include input device(s) 184 such as keyboard, mouse, pen, voice input device, touch input device, infrared cameras, video input devices, and/or any other input device. Output device(s) 182 such as one or more displays, speakers, printers, and/or any other output device may also be included in device 172. Input device(s) 184 and output device(s) 182 may be connected to device 172 via a wired connection, wireless connection, or any combination thereof. In one embodiment, an input device or an output device from another computing device may be used as input device(s) 184 or output device(s) 182 for computing device 172.

Components of computing device 172 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 172 may be interconnected by a network. For example, memory 178 may be comprised of multiple physical memory units located in different physical locations interconnected by a network.

Those skilled in the art will realize that storage devices utilized to store computer readable instructions may be distributed across a network. For example, a computing device 200 accessible via network 188 may store computer readable instructions to implement one or more embodiments provided herein. Computing device 172 may access computing device 200 and download a part or all of the computer readable instructions for execution. Alternatively, computing device 172 may download pieces of the computer readable instructions, as needed, or some instructions may be executed at computing device 172 and some at computing device 200.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A computer system, comprising:
   one or more processors; and
   one or more computer-readable media having stored thereon computer-executable instructions that are executable by the one or more processors to cause the computer system to perform at least the following:
   identify a first geographical location of a first computing device corresponding to a first invitee to an event, and identify a second geographical location of a second computing device corresponding to a second invitee to the event, based on geographical data received from each computing device;
   generate an event presentation user interface, including generating a first invitee presence indicator indicating that the first invitee is within a predetermined distance from a geographical location of the event based on the first geographical location of the first computing device, and generating a second invitee presence indicator indicating the second invitee is outside of the predetermined distance from the geographical location of the event based on the second geographical location of the second computing device;
   detect that the second computing device has moved to a third geographical location that is within the predetermined distance from the geographical location of the event; and
   based at least on the second computing device having moved to the third geographical location:
   update the second invitee presence indicator to indicate that the second invitee is within the predetermined distance from the geographical location of the event based on the third geographical location of the second computing device; and send a notification to at least a third computing device indicating that the second invitee has arrived at the event.

2. The computer system of claim 1, wherein the first invitee presence indicator indicating that the first invitee is within the predetermined distance from a geographical location of the event comprises the first invitee presence indicator indicating that the first invitee has arrived at the event.

3. The computer system of claim 1, wherein the second invitee presence indicator indicating that the second invitee is outside of the predetermined distance from a geographical location of the event comprises the second invitee presence indicator indicating that the first invitee has not yet arrived at the event.

4. The computer system of claim 1, wherein the event presentation user interface comprises a map user interface.

5. The computer system of claim 4, wherein the map user interface indicates the geographical location of the event on a map.

6. The computer system of claim 4, wherein the first invitee presence indicator indicates the first geographical location on the map.

7. The computer system of claim 4, wherein the second invitee presence indicator initially indicates the second geographical location on the map, and then indicates the third geographical location on the map.

8. The computer system of claim 4, wherein the map user interface indicates a geographical boundary on a map based on the predetermined distance.

9. The computer system of claim 1, wherein the computer-executable instructions that are also executable by the one or more processors to cause the computer system to:
  receive, from at least one of the first computing device or the second computing device, an event plan suggestion comprising the graphical location as a suggested geographical location for the event; and
  associate the geographical location with the event based on the event plan suggestion.

10. A method, implemented at a computer system that includes one or more processors, the method comprising:
  identifying a first geographical location of a first computing device corresponding to a first invitee to an event, and identify a second geographical location of a second computing device corresponding to a second invitee to the event, based on geographical data received from each computing device;
  generating an event presentation user interface, including generating a first invitee presence indicator indicating that the first invitee is within a predetermined distance from a geographical location of the event based on the first geographical location of the first computing device, and generating a second invitee presence indicator indicating the second invitee is outside of the predetermined distance from the geographical location of the event based on the second geographical location of the second computing device;
  detecting that the second computing device has moved to a third geographical location that is within the predetermined distance from the geographical location of the event; and
  based at least on the second computing device having moved to the third geographical location:
    updating the second invitee presence indicator to indicate that the second invitee is within the predetermined distance from the geographical location of the event based on the third geographical location of the second computing device; and
    sending a notification to at least a third computing device indicating that the second invitee has arrived at the event.

11. The method of claim 10, wherein the first invitee presence indicator indicating that the first invitee is within the predetermined distance from a geographical location of the event comprises the first invitee presence indicator indicating that the first invitee has arrived at the event.

12. The method of claim 10, wherein the second invitee presence indicator indicating that the second invitee is outside of the predetermined distance from a geographical location of the event comprises the second invitee presence indicator indicating that the first invitee has not yet arrived at the event.

13. The method of claim 10, wherein the event presentation user interface comprises a map user interface.

14. The method of claim 13, wherein the map user interface indicates the geographical location of the event on a map.

15. The method of claim 13, wherein the first invitee presence indicator indicates the first geographical location on the map.

16. The method of claim 13, wherein the second invitee presence indicator initially indicates the second geographical location on the map, and then indicates the third geographical location on the map.

17. The method of claim 13, wherein the map user interface indicates a geographical boundary on a map based on the predetermined distance.

18. The method of claim 10, wherein the computer-executable instructions that are also executable by the one or more processors to cause the computer system to:
  receive, from at least one of the first computing device or the second computing device, an event plan suggestion comprising the graphical location as a suggested geographical location for the event; and
  associate the geographical location with the event based on the event plan suggestion.

19. A computer program product comprising one or more hardware storage devices having stored thereon computer-executable instructions that are executable by one or more processors of a computer system to cause the computer system to perform at least the following:
  receive, from at least one of a first computing device corresponding to a first invitee to an event or a second computing device corresponding to a second invitee to the event, an event plan suggestion comprising the graphical location as a suggested geographical location for the event;
  associate the geographical location with the event based on the event plan suggestion;
  identify a first geographical location of the first computing device, and identify a second geographical location of the second computing device, based on geographical data received from each computing device;
  generate an event presentation user interface, including generating a first invitee presence indicator indicating that the first invitee is within a predetermined distance from a geographical location of the event based on the first geographical location of the first computing device, and generating a second invitee presence indicator indicating the second invitee is outside of the predetermined distance from the geographical location of the event based on the second geographical location of the second computing device;

detect that the second computing device has moved to a third geographical location that is within the predetermined distance from the geographical location of the event; and based at least on the second computing device having moved to the third geographical location:

update the second invitee presence indicator to indicate that the second invitee is within the predetermined distance from the geographical location of the event based on the third geographical location of the second computing device; and send a notification to at least a third computing device indicating that the second invitee has arrived at the event.

20. The computer program product of claim 19, wherein the event presentation user interface comprises a map user interface.

* * * * *